May 29, 1962
J. W. McDUFFIE
3,036,514
HAY BALER
Filed Nov. 29, 1960
2 Sheets-Sheet 1
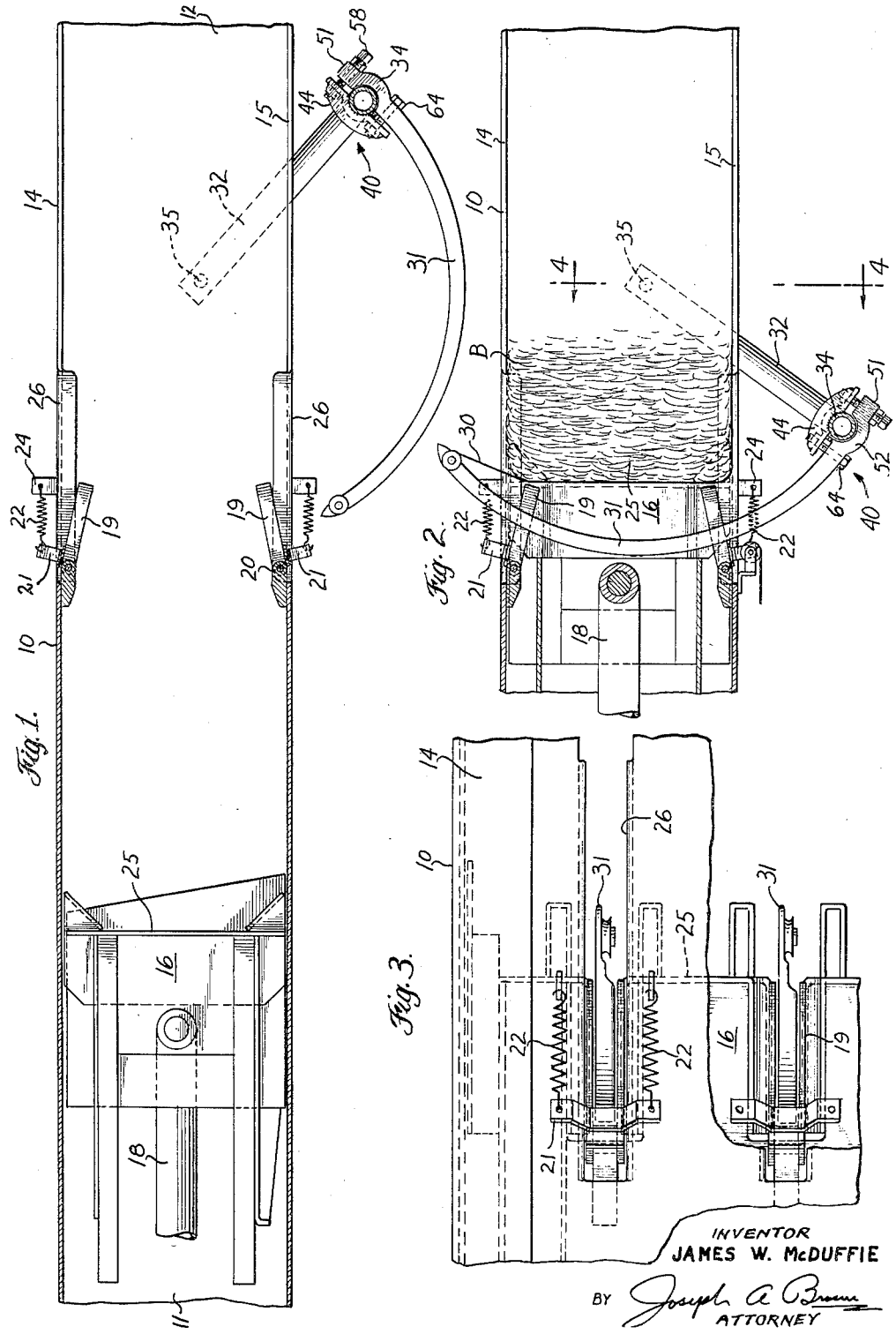
INVENTOR
JAMES W. McDUFFIE
BY Joseph A. Brown
ATTORNEY May 29, 1962 J. W. McDUFFIE 3,036,514
HAY BALER
Filed Nov. 29, 1960 2 Sheets-Sheet 2
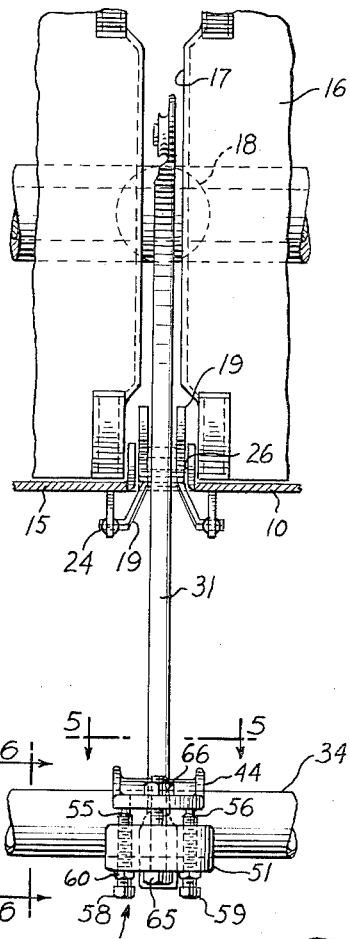
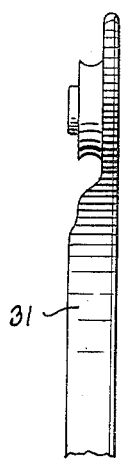
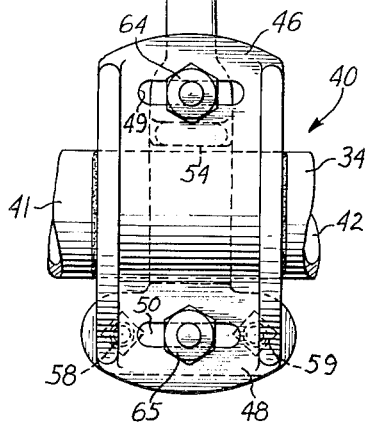
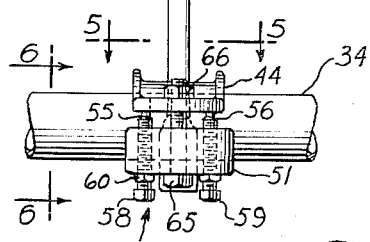
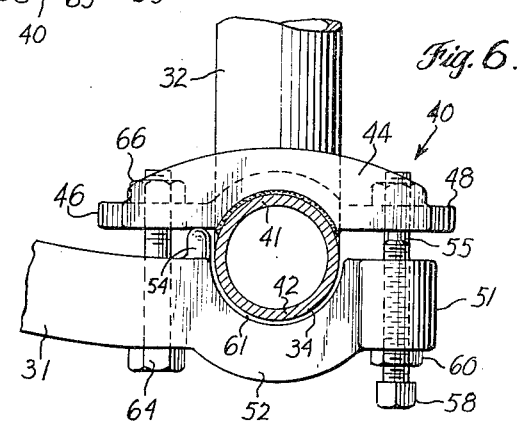
INVENTOR
JAMES W McDUFFIE
BY Joseph A. Brown
ATTORNEY 3,036,514
HAY BALER
James W. McDuffie, New Holland, Pa., assignor to Sperry Rand Corporation, New Holland, Pa., a corporation of Delaware
Filed Nov. 29, 1960, Ser. No. 72,399
10 Claims. (Cl. 100—19)

This invention relates generally to hay balers and more particularly to improved means for mounting tying mechanism needles on a baler.

In an automatic hay baler, hay is delivered to a bale chamber and compressed by a bale forming plunger. Each completed bale is banded with twine or wire. The tying medium is extended around each bale by needles which are projectable across the bale chamber through openings in opposite sides thereof. It is desirable to keep the dimensions of the openings through which the needles pass as small as possible to minimize the escape of hay from the bale chamber. Further, it is necessary that the needles deposit the tying medium with precision in the mechanisms which are to make the ties. Therefore, the needles must travel in relatively narrow paths. If the needles do not travel in proper paths, they will fail to deliver the tying medium properly to the tiers or strike some baler structure causing damage.

Conventionally, needles are clamped to the bight portion of a yoke, the portions of the yoke on which the needles are mounted being machined to provide proper supporting surfaces. In spite of such machining, which is costly, sometimes the needles do not extend properly relative to the bale chamber across which they must move. Needle yokes are usually fabricated from tubular stock and any out of roundness is detrimental to the needle mounting. The machining operations to hold the mounting portions of the yoke within acceptable tolerances, substantially increases the cost of and complicates the manufacturing procedures.

Heretofore, needle mountings have been such that the needles are capable of lateral adjustment along the bight of the yoke on which they are carried and pivotal adjustment about the transverse axis of the bight. These two adjustments generally provide adequate needle adjustment. However, in some instances such two adjustment factors are insufficient to get the needles in proper operative locations. Particularly, changes in the planes in which the needles extend are frequently required for an optimum arrangement and presently available mounting structures can not provide such adjustments.

A main object of this invention is to provide improved means for mounting a needle on a hay baler.

Another object of this invention is to provide needle mounting means which enables optimum positioning of needles relative to a bale chamber with which the needles are associated and across which they must pass to deposit a tying medium with exactness in a tying mechanism.

Another object of this invention is to provide needle mounting means which permits a change in the plane of the needle relative to the yoke bight on which it is carried, as well as lateral and angular adjustment of the needle.

A further object of this invention is to provide a needle mounting structure which requires no machining of the yoke on which the needle is carried thereby reducing fabricating costs.

A still further object of this invention is to provide a needle mounting structure having parts which are relatively simple and inexpensive whereby the structure is easy to manufacture, assemble and adjust.

Other objects of this invention will be apparent hereinafter from the specification and from the recital in the appended claims.

In the drawings:

FIG. 1 is a vertical section through a bale case showing a plunger and needles retracted, such needles being adjustably mounted according to this invention;

FIG. 2 is a view similar to FIG. 1 but with the plunger in forward position and with the needles projected across the bale case and through slots in the plunger;

FIG. 3 is an enlarged fragmentary plan view of FIG. 2 with a portion of the bale case broken away to show the forwardly projecting plunger and the needles extending therethrough;

FIG. 4 is a fragmentary section on the same scale as FIG. 3 and taken on the line 4—4 of FIG. 2 but showing the needle yoke and a needle thereon in an intermediate position of its stroke; and FIGS. 5 and 6 are enlarged sections taken on the lines 5—5 and 6—6, respectively, of FIG. 4, showing the details of the needle mounting structure.

Referring now to the drawings by numerals of reference, 10 denotes a bale case having a forward end 11 and a rear end 12. The bale chamber is rectangular in cross section, having a top wall 14 and a bottom wall 15. Reciprocable in the bale chamber is a plunger 16 driven by a connecting rod 18 from a suitable source of power, not shown. In FIG. 1, the plunger 16 is shown in a retracted position. Hay is delivered into the bale chamber in front of the plunger by means not shown. On a working stroke, the plunger moves rearwardly to an extended position as shown in FIG. 2. Hay delivered in front of the plunger is compressed to form a bale B. Hay is delivered into the bale chamber 10 in successive charges and it takes a plurality of charges to make up one bale. To hold the hay from expanding toward the forward end 11 of the bale case when the plunger retracts, a pair of hay dogs 19 are provided on the top and bottom of the bale chamber. These dogs are pivotally mounted at 20 and normally project into the bale case. An outwardly extending arm 21 is provided to which springs 22 are connected. The opposite ends of the springs are connected to fixed tabs 24. The springs bias the hay dogs to a position wherein they extend into the bale case. When the plunger moves from the forward end 11 toward the rear end 14 of bale case 10, it engages the dogs 19 and pivots them outwardly relative to the bale case. Once the working face 25 of the plunger passes the dogs, the springs 22 pivot them back to their normal positions as shown in FIG. 2 where the dogs will hold the bale B from expanding forwardly when the plunger is retracted.

As shown in FIGS. 3 and 4, each hay dog 19 comprises a pair of laterally spaced metal straps. The hay dogs swing into and out of the bale case through openings 26 in the top and bottom walls thereof and between the straps which form the dogs.

When the bale B is completed, a tying medium 30 (FIG. 2), is projected around the completed bale by needles 31. The needles pass through openings 26, through spaces 17 in plunger 16 and between the straps of hay dogs 19. The tying medium is delivered to tying mechanisms, not shown, on top wall 14. The needles are of arcuate configuration and are carried on a U-shaped yoke 32 which straddles the sides of bale chamber 10. Yoke 32 has a bight portion 34 disposed along the bottom wall 15 of the bale chamber and extending transverse to the needles 31. The yoke 32 is pivotally mounted at 35 and is swingable from the position shown in FIG. 1 to the position shown in FIG. 2, by power means not shown. This causes the needles 31 to be projected from a retracted position to a projected position wherein they extend across the bale case and through the top and bottom walls 14 and 15, respectively.

As shown best in FIGS. 3 and 4, the clearances between the needles 31 and the parts through which they must pass is very limited. To insure that the needles travel in a desired path, they are adjustably connected to the bight 34 of yoke 32 by a mounting 40 constructed according to this invention and shown in detail in FIGS. 4–6.

The yoke is made of tubular stock and the bight 34 thereof has an upper side 41 and a lower side 42, FIGS. 5 and 6. Welded to the upper side 41 is a fixed bracket 44 having ears 46 and 48 at diametrically opposite sides of the bight 34. Ears 46 and 48 are provided with elongate slots 49 and 50, respectively, which extend parallel to each other and to the axis of the bight 34.

Formed integrally with the needle 31 is a bracket 51 which is adapted to be connected to the fixed bracket 44. Bracket 51 has an arcuate section 52 generally concentric with the axis of bight 34. Section 52 surrounds a substantial portion of the lower section 42 of the bight. Bracket 51 has a three point contact with bracket 44, provided by elements 54, 55 and 56. The element 54 comprises an upstanding boss on needle 31 which is slightly elongate in the direction of extension of the bight 34 as shown in FIG. 5 and rounded at its upper outer end as shown best in FIG. 6. The rounded portion of the element 54 engages the underside of the ear 46 of the bracket 44. On the opposite side of the bight 34, the elements 55 and 56 engage the underside of ear 48 of the bracket 44. Elements 55 and 56 comprise the ends of adjustable screws 58 and 59 which thread through suitable tapped openings in bracket 51 of the needle. Lock nuts 60 are provided to lock the screws in adjusted position.

As clearly shown in FIG. 6, bracket portion 51 of needle 31 is spaced from direct engagement with bight 34. The space, indicated at 61, is provided so that the extension of the needle is not dependent upon bight 34 and its roundness. The needle extension is determined by the three point contact of the elements 54, 55 and 56 with the bracket 44. To detachably fasten needle 31 to the yoke bight, fastening bolts 64 and 65 are provided which extend through bracket 51 and through the slots 49 and 50 in the bracket 44. Nuts 66 are provided for the bolts.

To properly position a needle 31 relative to the bale case 10, the openings 26, the space 17 in plunger 16 and the spaces between the straps of the hay dogs 19, the assembler is provided with three adjustment factors. By loosening the bolts 64 and 65, needle 31 can be laterally adjusted along the axis of the bight 34, such adjustment being made possible by the elongate slots 49 and 50 in fixed bracket 44. Angular adjustment of needle 31 is obtained by simultaneously and proportionately adjusting screws 58 and 59 inwardly or outwardly, as the case may be. During such adjustment, the needle 31 pivots about the element 54 and the angular extension of the needle 31 is adjusted. To vary the plane in which needle 31 extends relative to the bight 34, the screws 58 and 59 are variably adjusted. As can be seen from viewing FIG. 4, if the screw 58 is adjusted inwardly and the screw 59 outwardly, upper end of needle 31 will be shifted toward the right. Conversely, if the screw 59 is adjusted inwardly and the screw 58 outwardly, the upper end of needle 31 will be shifted toward the left. Thus, the plane in which needle 31 operates is variable. The adjustments of the needle provided by the mounting structure are thus axial, angular and pivotal.

Since the needle 31 has no direct contact with the yoke 34, being connected thereto through bracket 51 of the needle and bracket 44 affixed to the yoke, no close tolerances have to be provided in manufacturing the structure. Since the arcuate portion 52 of the needle does not directly engage the portion 42 of yoke 34, there is no necessity for machining the periphery of the yoke bight to accommodate the needle. Thus, a costly manufacturing step is eliminated. The three way adjustment of the needle on the yoke enables the assembly of the needle relative to other baler structure simple and easy. The needle can be mounted to travel in a precise path. Likewise, in the field, the baler operator may adjust the needles as desired. When adjusted, the lock nuts 60 insure that the adjusting screws 58 and 59 remain in place while the fastening bolts 64 and 65 retain the needles securely to the yoke which drives them.

While this invention has been described in connection with a particular embodiment thereof, it will be understood that it is capable of further modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described my invention, what I claim is:

1. In a hay baler, a bale case, a needle projectable across said bale case through openings therein, said needle extending in a given plane, a support member having an axis extending transverse to said needle and said plane, and means connecting said needle to said support member for lateral adjustment along the axis of the member, for angular adjustment about said axis, and pivotal adjustment to vary said given plane relative to said axis, said connecting means comprising a first bracket fixed to said support member, a second bracket fixed to said needle and spaced from said support member, and means for connecting said brackets and for adjusting said second bracket relative to said first bracket.

2. In a hay baler, a bale case, a needle projectable across said bale case through openings therein, said needle extending in a given plane, a support member having an axis extending transverse to said needle and said plane, and means connecting said needle to said support member for lateral adjustment along the axis of the member, for angular adjustment about said axis, and pivotal adjustment to vary said given plane relative to said axis, said connecting means comprising a bracket fixed to said support member, a bracket fixed to said needle, a plurality of elements on one bracket engaging the other bracket and holding said needle bracket spaced from said support member, at least one of said elements being adjustable, and means for detachably connecting said brackets to each other.

3. In a hay baler, a bale case, a needle projectable across said bale case through openings therein, said needle extending in a given plane, a support member having an axis extending transverse to said needle and said plane, and means connecting said needle to said support member for lateral adjustment along the axis of the member, for angular adjustment about said axis, and pivotal adjustment to vary said given plane relative to said axis, said connecting means comprising a bracket fixed to said support member, a bracket fixed to said needle and spaced from said support member, three elements on one bracket engaging the other bracket, two of said elements being adjustable relative to said one bracket, and means for detachably connecting said brackets to each other.

4. In a hay baler, a bale case, a needle projectable across said bale case through openings therein, said needle extending in a given plane, a support member having an axis extending transverse to said needle and said plane, and means connecting said needle to said support member for lateral adjustment along the axis of the member, for angular adjustment about said axis, and pivotal adjustment to vary said given plane relative to said axis, said connecting means comprising a bracket fixed to said support member, a bracket fixed to said needle and spaced from said support member, three triangularly arranged elements on one bracket engaging the other bracket, two of said elements being located on one side of said support member and spaced in a direction along said transverse axis, the other of said elements being located on the opposite side of said support member, said two elements being adjustable relative to said one bracket and said other element having curved surfaces whereby said one bracket may freely pivot relative to said other bracket, and means for detachably connecting said brackets to each other.

5. In a hay baler, a bale case, a needle projectable across said bale case through openings therein, said needle extending in a given plane, a support member having an axis extending transverse to said needle and said plane, and means connecting said needle to said support member for lateral adjustment along the axis of the member, for angular adjustment about said axis, and pivotal adjustment to vary said given plane relative to said axis, said connecting means comprising a bracket fixed to said support member, a bracket fixed to said needle and spaced from said support member, three triangularly arranged elements on one bracket engaging the other bracket, two of said elements being located on one side of said support member and spaced in a direction along said transverse axis, the other of said elements being located on the opposite side of said support member, said two elements being adjustable relative to said one bracket and said other element having curved surfaces whereby said one bracket may freely pivot relative to said other bracket, and a fastening member on each side of said support member and connecting said brackets, at least one of said brackets having slot means for each fastening member whereby said needle bracket may be adjusted along said transverse axis relative to said support member bracket.

6. In a hay baler, a bale case, a needle projectable across said bale case through openings therein, said needle extending in a given plane, a support member having an axis extending transverse to said needle and said plane, and means connecting said needle to said support member for lateral adjustment along the axis of the member, for angular adjustment about said axis, and pivotal adjustment to vary said given plane relative to said axis, said connecting means comprising a bracket fixed to said support member and having a pair of outwardly extending ears on diametrically opposite sides of the support member, each of said ears having an elongate slot extending generally parallel to said transverse axis, a bracket fixed to said needle and spaced from said support member, said needle bracket having three triangularly arranged elements, one engageable with one of said ears and two with the other of said ears, said one element having curved bracket engaging surfaces, said two elements being adjustable relative to said needle bracket, and a fastening member projecting through each of said elongate slots and detachably connecting said brackets to each other.

7. A hay baler as recited in claim 6 wherein said one element is elongate in a direction generally parallel to said transverse axis.

8. A hay baler as recited in claim 6 wherein said two elements comprise screws threaded through said needle bracket and each having an end engageable with said other ear of said support member bracket.

9. A hay baler as recited in claim 8 wherein means is provided for locking said screws in adjusted position.

10. In a hay baler, a bale case, a needle projectable across said bale case through openings therein, a yoke straddling said bale case and having a tubular bight portion along one side of said bale case, said needle extending in a given plane and said bight having an axis transverse to said plane, and means connecting said needle to said bight for lateral adjustment along said transverse axis, for angular adjustment about said axis, and pivotal adjustment to vary said given plane relative to said axis, said connecting means comprising a bracket fixed relative to said bight and having a pair of outwardly extending ears on diametrically opposite sides of the bight, each of said ears having an elongate slot extending generally parallel to said transverse axis, a bracket fixed to said needle and having an arcuate portion generally concentric with said axis and spaced from the periphery of said bight, three triangularly arranged elements on one of said brackets and engaging the other bracket, two of said elements being adjustable and located on one side of said bight and spaced in a direction along said transverse axis, the other element having curved surfaces engaging said other bracket, and means for detachably connecting said brackets to each other.

References Cited in the file of this patent
UNITED STATES PATENTS
2,822,749  Nolt et al. _____ Feb. 11, 1958